June 12, 1951  P. VALENTINE ET AL  2,556,240
ROTARY CUTTING TOOL
Filed Aug. 2, 1945

INVENTOR.
Patrick Valentine
and Joseph Zachary Lichtman
BY

ATTORNEY.

Patented June 12, 1951

2,556,240

UNITED STATES PATENT OFFICE 2,556,240

ROTARY CUTTING TOOL

Patrick Valentine and Joseph Z. Lichtman,
New York, N. Y.

Application August 2, 1945, Serial No. 608,558

1 Claim. (Cl. 30—310)

(Granted under the act of March 3, 1883, as
amended April 30, 1928; 370 O. G. 757)

This invention relates to a rotary cutting tool and more particularly to a rotary cutting tool for cutting a circular piece from a sheet of material.

An object of this invention is to provide a device for cutting circular pieces from a sheet of material.

A further object is to provide a rotary cutting tool for use in a conventional drill press to cut circular pieces from a sheet of material such as rubber, cardboard, wallboard and the like.

Figure 1:
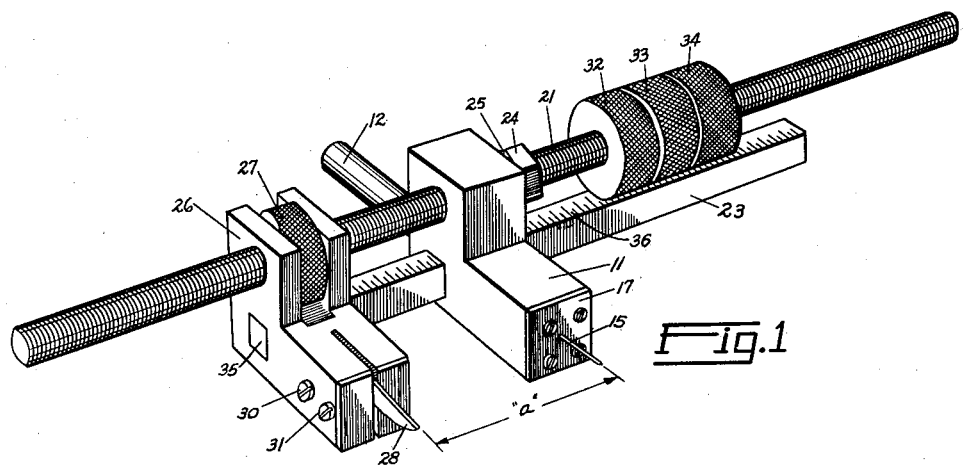
Figure 2:
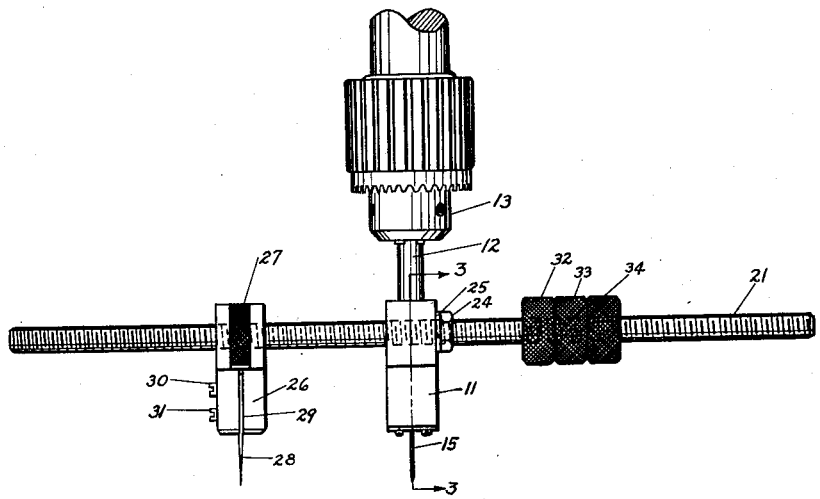
Figure 3:
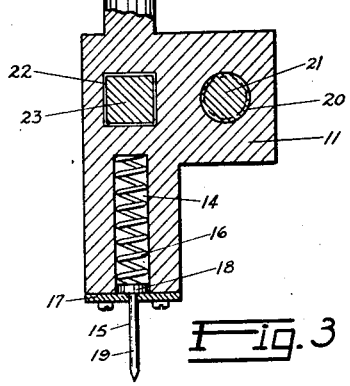

Further objects and advantages of this invention, as well as its construction, arrangement and operation, will be apparent from the following description and claim in connection with the accompanying drawing, in which, Figure 1 is an isometric view showing a preferred embodiment of the invention, Figure 2 is a front elevation of the device of Figure 1 shown clamped in the chuck of a conventional drill press, and Figure 3 is a fragmentary cross-sectional elevation, taken on line 3—3 of Figure 2.

A preferred form of the present invention comprises the body member or spindle block 11, that is provided with a peg or spindle 12 projecting from one end of the block 11 and adapted to be clamped in the chuck 13 of a conventional drill press.

The body member 11 is provided with a recess 14, Figure 3, at its lower end opposite the peg 12, in which is mounted a locator or center pin 15, backed by a resilient coil spring 16. Plate 17 holds the head 18 of pin 15 and spring 16 within the recess 14 and has an aperture through which the shank 19 of the pin 15 extends. The pin 15 is disposed coaxially with the peg 12 and is directed oppositely away from it.

A threaded aperture 20 extends through the upper portion of spindle block 11 in a direction transversely of the common axis of the peg 12 and center pin 15, the aperture 20 carrying the threaded adjusting screw 21. The body member 11 also contains a rectangular aperture 22 which is parallel to the threaded aperture 20 and receives the guide bar 23 slidable lengthwise therein. Nut 24 and lock washer 25 hold the adjusting screw 21 firmly in position in the aperture 20, the screw 21 being thus extended in opposite directions away from the body member 11 as shown.

The cutter supporting block 26 is carried by one extension of the adjusting screw 21, and is adjustably positioned lengthwise of the adjusting screw 21 by means of micrometer adjusting screw nut 27. The cutter blade 28 is secured in slot 29 of block 26 by means of set screws 30 and 31. By rotating the nut 27, the cutter carrying block 26 is traversed lengthwise of screw 21 towards or away from the body member 11, thereby adjusting the position of the cutter 28 and adjusting the radius of the cut that is designated in the drawing by the dimension "a". The bar 23 is attached at its end 35 to the cutter carrying block 26, and extends away therefrom into and through the aperture 22 of the body member, the bar 23 sliding lengthwise in aperture 22 as the block 26 is traversed lengthwise of screw 21. The bar 23 includes a calibrated scale 36 that indicates the radial displacement of the cutter blade 28.

Threaded counterweights 32, 33 and 34 are mounted on the portion of adjusting screw 21 that extends away from the body member 11 in the direction opposite cutter block 26, and are adjustably positionable lengthwise of screw 21 to counterbalance the weight of the cutter block 26 thereby to eliminate vibration during the operation of the device.

In the operation of the device, the peg or spindle 12 is inserted and secured in chuck 13. The cutter block 26 is moved by means of micrometer adjusting screw nut 27 to provide the proper cutting radius as indicated on the scale 36 of the guide bar 23. The counterweights 32, 33, 34 are then adjusted to counterbalance the weight of the cutter block 26 and eliminate vibration during the high speed rotary cutting operation. The sheet of material is clamped on the bed plate and the chuck lowered to bring the locator pin 15 and cutting blade 28 in contact with the sheet. As the cutting blade starts cutting into the sheet, the locator pin 15 will be forced upwardly into the recess 14. Thus the cutting blade can cut through a relatively thick piece of material without the locator pin piercing the material.

The device can obviously be used to cut circular pieces of varying diameter from materials of different thicknesses to a very high degree of accuracy and without requiring any trimming or finishing to the exact size required.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

In a cutting tool adapted to be attached to the spindle of a drill press or the like machine, a body member, a device at one end of the body member for attachment to the drill-press spindle and a center pin coaxial therewith and extending from the opposite end of the body member, the center pin being mounted resiliently to recede into the body member, a rod mounted slidable through the body member transversely of the axis of the center pin in opposite directions, a cutter block carried by the rod on one side of the body member and including a mounting adapted to support a cutter blade for cutting a circle around the center pin, an adjustment screw threaded through the body member parallel to the rod and threaded through the cutter block, a nut threaded onto the adjustment screw and held by the cutter block for traversing the rod lengthwise to position the cutter block selectively towards and away from the body member, a weight threaded on the adjusting screw on the side of the body member opposite the cutter block and positionable to counterbalance the weight of the cutter block.

PATRICK VALENTINE.
JOSEPH Z. LICHTMAN.

REFERENCES CITED

The following references are of record in the file of this patent:

UNITED STATES PATENTS

| Number | Name | Date |
|---|---|---|
| 58,924 | Webster | Oct. 16, 1866 |
| 733,821 | Dixon | July 14, 1903 |
| 769,200 | Uschold | Sept. 6, 1904 |
| 997,310 | Mehlem | July 11, 1911 |
| 1,118,082 | Von Holdt | Nov. 24, 1914 |
| 1,270,254 | Bach, Jr. | June 25, 1918 |
| 1,353,526 | Frengle | Sept. 21, 1920 |
| 1,584,584 | Wood | May 11, 1926 |
| 1,746,463 | Elder | Feb. 11, 1930 |
| 1,924,717 | Hall | Aug. 29, 1933 |
| 2,226,762 | Frey | Dec. 31, 1940 |
| 2,263,637 | Maupin | Nov. 25, 1941 |